Oct. 21, 1969  G. EGGSTEIN  3,473,329
PISTON ARRANGEMENT FOR FLUID-OPERATED BRAKE SYSTEM
Filed Sept. 6, 1967
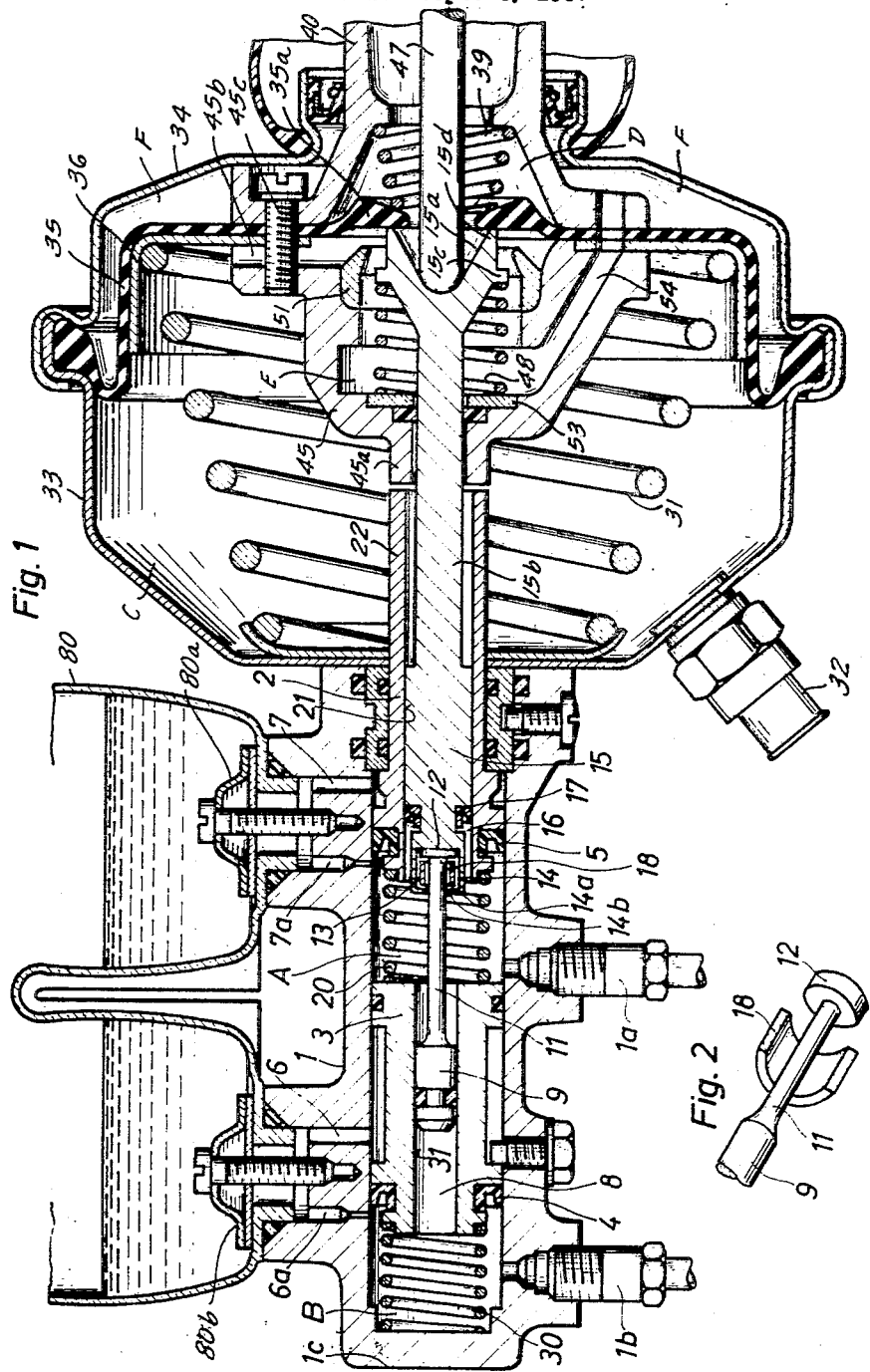
INVENTOR
GIORGIO EGGSTEIN
BY  Michael S. Heike
ATTORNEY United States Patent Office 3,473,329
Patented Oct. 21, 1969

3,473,329
PISTON ARRANGEMENT FOR FLUID-OPERATED BRAKE SYSTEM
Giorgio Eggstein, San Remo, Italy, assignor to Ernst Heinkel Aktiengesellschaft, Stuttgart-Zuffenhausen, Germany
Filed Sept. 6, 1967, Ser. No. 665,759
Claims priority, application Germany, Sept. 24, 1966, H 60,590
Int. Cl. F15b 7/04, 7/08; B60t 11/10
U.S. Cl. 60—54.6                                9 Claims

ABSTRACT OF THE DISCLOSURE

Pressure indicating pistons which are movable in cylinder bores of master pistons moving in a master cylinder, are connected by joint means so that greater tolerance ranges are permitted for the pistons and cylinders.

CROSS-REFERENCE TO A RELATED APPLICATION

The present invention relates to an improvement of a power brake arrangement disclosed in the copending application Ser. No. 595,089 filed Nov. 17, 1966, of which I am a coinventor.

BACKGROUND OF THE INVENTION

The patent application Ser. No. 595,089 discloses a power brake arrangement including an operator actuated control means having two pressure indicating pistons movable in cylinder bores of two master pistons which are slidable in a master cylinder. The control means is operated by the brake pedal of a motorcar, and the pressures acting on the pressure indicating pistons resist the depression of a brake pedal to a degree depending on the brake forces produced by the two master pistons when the same are power-operated under the control of the brake pedal.

The master pistons form between each other a first pressure chamber, and the second master piston forms in the master cylinder a second pressure chamber, the first and second pressure chambers being respectively connected with first and second brake cylinders of two pairs of brakes, which may act, for example, on the front wheels and rear wheels of the motorcar. When one of the brake system fails, for example due to overheating of the brake fluid at one brake piston so that steam bubbles are formed, the pressure acting on the pressure indicating piston of the other brake system indicates to the driver the actually exerted brake force.

Due to the relative movement between the master pistons and the master cylonder, and also between the pressure indicating pistons and the master pistons, very narrow tolerances are required for the pistons and cylinder bores in which they move. The great precision required for fitting the parts to each other causes particular difficulties if the pressure indicating pistons, or the master pistons have to be replaced in a repair shop. Any inaccuracy results in inaccurate axial guidance of the pistons, which causes great wear of the pressure indicating pistons and of the cylinder bores of the master pistons.

SUMMARY OF THE INVENTION

It is one object of the invention to overcome this disadvantage, and to provide a construction which assures a precise axial guidance of the pressure indicating pistons in the cylinder bores of the master pistons even at comparatively low tolerances.

Another object of the invention is to obtain accurate axial guidance of a plurality of first pistons in cylinder bores of a plurality of second pistons which are movable in a cylinder, irrespective of the relative movements between the first and second pistons, and between the second pistons and the cylinder.

With these objects in view, the pressure indicating pistons are connected to each other by joint means permitting a small angular movement of the pressure indicating pistons relative to each other.

One embodiment of the invention comprises a master cylinder, first and second master pistons mounted in the master cylinder and having first and second cylinder bores; and an operator actuated control means comprising first and second control pistons respectively located in the first and second cylinder bores, and joint means connecting the first and second control pistons.

Due to the provision of the joint means between the first and second control pistons, the control pistons and the master pistons can freely move relative to each other and to the master cylinder, even if the cylinder bores and piston surfaces are not finished to very narrow tolerances.

The invention is preferably applied to a fluid operated power brake arrangement. The first and second master pistons form between each other a first pressure chamber in the master cylinder, and the second master piston forms in the master cylinder a second pressure chamber. The first and second pressure chambers are connected with first and second brake cylinders of brake systems controlling, respectively, brakes which independently act on the wheels of a motorcar. The first and second control pistons are respectively subjected to the pressures in the first and second pressure chambers, and indicate the total pressure in the brake cylinders by counteracting the foot pressure exerted by the driver through the brake pedal on the control means. If one of the brakes fails, the resistance to the movement of the brake pedal is decreased, and is a measure of the brake force actually applied by the other brake. Preferably, the first control piston has a greater effective cross section than the second control piston, the ratio between the cross sections corresponding to the ratio between the desired different brake pressures in the first and second brake cylinders.

In the preferred embodiment of the invention, the control pistons are connected by a universal joint. The smaller control piston has a projecting piston rod whose end portion is provided with a flange retained in a cavity of the larger control piston by an inwardly projecting rim which is formed after insertion of the flange into the cavity. A spacer ring is preferably provided in the cavity between the flange and the rim, and surrounds the end portion of the piston rod.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary axial sectional view illustrating a piston arrangement in accordance with the invention for controlling two brake systems; and FIG. 2 is a fragmentary perspective view, partially in section, illustrating a detail of the embodiment of FIG. 1.

DESCRIPTION OF THE PREFERRED EMBODIMENTS

A master cylinder 1 has two outlet conduits 1a and 1b respectively connected to pairs of brake cylinders which control the brakes of the front and rear wheels, respectively, of a motorcar. Inlet ducts 6, 6a and 7, 7a connect the interior of master cylinder 1 with a container 80 for the brake fluid. A first master piston 2, and a second master piston 3, are mounted in master cylinder 1 for axial movement and have sealing rings 4 and 5, respectively. Master pistons 2 and 3 form between each other a first pressure chamber A, and master piston 3 forms with the closed end 1c of the master cylinder 1, a second pressure chamber B, pressure chambers A and B communicating with the outlet means 1a and 1b, respectively, which are connected with the two brake systems of the motorcar.

A spring 20 is disposed in pressure chamber A and abuts master pistons 1 and 2. Another springs 30 is located in pressure chamber B and abuts end wall 1c of master cylinder 1, and master piston 3.

Master piston 2 has a cylinder bore 16, and master piston 3 has a cylinder bore 8. The diameter of the cylindrical surface 21 of bore 16 of master piston 2 is greater than the diameter of the cylindrical surface 31 of bore 8 of master piston 3. A pressure indicating first control piston 15 is mounted in cylinder bore 16, and a second control piston 9 is mounted in cylinder bore 8.

In accordance with the invention, control piston 9 has a piston rod 11 of reduced diameter projecting toward control piston 15 and located in pressure chamber A. The end of piston rod 11 has a flange 12 located in a cylindrical cavity 13 in a reduced portion 14 of control piston 15.

Portion 14 is originally a circular wall, and when the flange 12 of piston rod 11 has been inserted into cavity 13, a circular spacing ring 18 is inserted into the cavity, whereupon the rim 14a of the circular wall 14 is bent inward to form an inwardly projecting rim having a central opening 14b surrounding piston rod 11, and loosely retaining spacing ring 18 and flange 12, so that a joint is formed permitting slight deviations of control pistons 15 and 9 from a position in which the axes of control pistons 15 and 9 exactly coincide. A slight displacement from this desired position may take place during relative movement between control pistons 15, 9, master pistons 2, 3, and master cylinder 1.

A power means or booster is provided for operating master pistons 2 and 3, and thereby the two brake systems I and II with a greater force than can be produced by the driver of the car.

The casing of the power means includes two shells 33 and 34 which are connected to each other by crimped annular edge portions between which the annular edge of a pot-shaped rubber membrane 35 is clamped. Membrane 35 has a circular central flange with a central opening. In the position of rest illustrated in FIG. 1, an annular piston 36 of angular cross section abuts one side of membrane 35 under the action of a coil spring 31 whose end abuts a fixed wall portion of shell 33. The tubular reduced end 22 of master piston 2 projects through an opening in shell 33 into a low pressure chamber C formed by shell 33 and membrane 35. The free end of portion 22 is located adjacent an annular portion 45a of a pressure body 45 which has an inner chamber E communicating through a conduit 45b with low pressure chamber C. Screws 45c secure another pressure body 40 to pressure body 45, and membrane 35 and annular piston 36 are clamped between pressure bodies 45 and 40. Elements 45, 40, 35 and 36 constitute the operating means of the power means by which the master pistons 2 and 3 are operated.

An annular valve seat member 51 is secured to pressure body 45 and forms a valve seat opposite the valve portion 35a of membrane 35, valve portion 35a being located in a chamber D in pressure body 40 which communicates with the atmosphere. Membrane 35, pressure body 40, and shell 34 form a chamber F which communicates through a conduit 54 passing through pressure bodies 45 and 40 with the inner low pressure chamber E in pressure body 45. A suction line 32 is connected to the engine of the car and produces subatmospheric pressure in chamber C, conduit 45b, chamber E, conduit 54, and chamber F.

An operating rod 47 connected with a brake pedal, not shown, passes through central openings in pressure body 40, valve portion 35a and abuts a seat 15a in an extension 15b of control piston 15 which projects into pressure body 45.

Piston portion 15b has a flanged portion or collar 15c of greater diameter located within annular valve seat member 51 and having a recess 15a. A spring 48 located in chamber E abuts an adjustment ring 53 and the flanged portion 15c, urges control piston 15, 15b to the right as viewed in FIG. 1, to the illustrated position in which the rim portion 15d abuts the valve portion 35a of membrane 35. Portion 15d is annular and formed with the frusto-conical recess 15a so that portion 15d forms a valve seat for valve portion 35a. Another spring 39 abuts a transverse wall of pressure body 40 and the other side of valve portion 35a to urge the same against the valve seat of rim portion 15d. A sealing ring 52 seals the inner chamber E, and pistons 9 and 15 are formed with annular recesses in which sealing rings are located so that the cylinder chambers A and B are sealed from each other and from the low pressure chamber C. The pressure exerted by spring 48 on control piston rod 15b can be adjusted by providing additional adjusting rings 53.

A container 80 contains brake fluid, for example, oil of a suitable viscosity, in separate cavities which respectively communicate through valves 80a and 80b with inlet ducts 6 and 7 in master cylinder 1 which open, respectively, into cylinder chambers A and B. When the driver depresses the brake pedal, control rod 47 and control pistons 9 and 15 are displaced. Further depression of the brake pedal and displacement of control rod 47 moves the valve seat portion 15d to a position in which valve portion 35a, which rests on the valve seat of annular member 51, cannot follow so that a gap is formed between portion 15d and valve portion 35a of membrane 35 which permits air under atmospheric pressure to flow from chamber D through the central opening in the annular valve portion 35a, and through the gap between the same and portion 35a into chamber E and through conduit 54 into chamber F. The low pressure chamber C is still separated from atmospheric pressure by the abutment of valve portion 151 on the valve seat of annular member 51.

Due to the fact that atmospheric pressure prevails in chamber F on one side of the flexible membrane 35, while subatmospheric pressure prevails on the other side in chamber C, membrane 35 is moved together with annular piston 16 to the left as viewed in the drawing. Since operating members 45 and 40 are secured to annular piston 36, they also move to the left, and portion 45a of pressure body 45 pushes master piston 2 to the left so that the pressure in cylinder chamber A, conduit means 1a, and in the pistons of one brake system is increased due to the booster effect.

The pressure in cylinder chamber A acts on master piston 1 and displaces the same so that the pressure is increased in cylinder chamber B, conduit means 1b, and in the cylinders of the second brake system.

During the initial part of the movement of control rod 17, the pressure in cylinder chambers A and B and in the conduits of the brake systems is only increased by the action of control pistons 9 and 15. Since the operator has to overcome the reaction force exerted on control pistons 9 and 15 by the pressures in cylinder chambers A and B, the operator feels a counterforce which is a measure of the braking force exerted by the brake systems.

When the booster action of the power means starts, the pressures in conduits 1a and 1b and in the brake systems are rapidly increased without any action by the operator. However, the increased pressures in cylinder chambers A and B act on the control pistons 9 and 15 so that a counterforce representing the actually applied brake force acts on control rod 47, and resists further depression of the brake pedal.

Assuming that a failure of the brake system of main piston 15 takes place while the booster action of the power means is effective, the very rapid movement of master pistons 2 and 3 is relative to control pistons 9 and 15. Control pistons 9, 15 follow master pistons 2 and 3 toward the left due to the pressure exerted by the operator on the brake pedal in accordance with the previously prevailing pressure in chambers A and B. The pressures in chambers A and B respectively produce reaction forces acting on control pistons 9 and 15 to resist the pressure applied by the driver to the brake pedal, so that the driver has an indication of the pressures in the two brake systems, if both properly operate, while in the event of failure of one brake system, the pressure of the functioning brake system acts on the respective control piston 15 or 9, so that the same indicates to the driver the still prevailing brake pressure.

In accordance with the operation of the brake pedal, the control means 15, 9 is displaced to the left or to the right, while the power booster is actuated to displace the master pistons 2 and 3, or to permit the return of the master pistons to the right. The resulting relative movements between the master pistons 2 and 3, and the pressure indicating control pistons 15 and 9, are considerably facilitated by the joint means 11 to 14, and 18.

It will be understood that each of the elements described above, or two or more together, may also find a useful application in other types of tandem piston arrangements differing from the types described above.

While the invention has been illustrated and described as embodied in a joint connecting two control pistons mounted in cylinder bores of two master pistons for relative movement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A fluid-operated brake system comprising, in combination, first and second brake systems respectively including first and second conduit means for a brake fluid; master cylinder means forming a cylinder communicating with said first and second conduit means; first and second master pistons located in said cylinder and forming in the same first and second chambers respectively communicating with said first and second conduit means, said first and second master pistons having first and second cylinder bores respectively communicating with said first and second chambers; power means; means controlled by said power means for moving said first master piston whereby said second master piston is also moved whereby the pressure in said first and second chambers and in said first and second conduit means is increased for power operating said first and second brake systems; and an operator-actuated control means having a portion for actuating said power means, and including first and second control pistons respectively located in said first and second cylinder bores and responsive to reaction forces produced by pressures in said first and second chambers to move relative to said master pistons, and joint means connecting said first and second control pistons so that said control pistons and master pistons move freely relative to each other and to said master cylinder.

2. A fluid-operated brake system as claimed in claim 1 wherein said first control piston has a greater effective cross section than said second control piston; wherein said operator-actuated control means include a rod connected at one end to said second control piston and having a flange at the other end, and wherein said first control piston has a cavity in which said flange is located, and an inwardly projecting annular rim for loosely retaining said flange and having a central opening through which said rod passes, said flange and said rim constituting said joint means.

3. A fluid-operated brake system as claimed in claim 2, wherein said operator-actuated control means and said joint means further include a spacing ring located in said cavity surrounding said rod between said flange and said inwardly projecting rim.

4. A fluid-operated brake system as claimed in claim 1, wherein said joint means includes a universal joint.

5. A fluid-operated brake system as claimed in claim 1, wherein said joint means includes a cavity in said first control piston having an opening, a rod secured to said second control piston and having an end portion passing through said opening into said cavity, and means for holding said end portion of said rod freely movable in said cavity.

6. A fluid-operated brake system as claimed in claim 1 for operating first and second brakes; wherein said first and second master pistons form between each other said first pressure chamber in said master cylinder, and said second master piston forms in said master cylinder said second pressure chamber wherein said first control piston has a greater effective cross section than said second control piston, the ratio between said cross sections corresponding to the ratio between the brake pressures in said first and second brake systems.

7. A fluid-operated brake system as claimed in claim 6, wherein said joint means includes a cavity in said first control piston having an opening, a rod secured to said second control piston and having an end portion passing through said opening into said cavity, and means for holding said end portion of said rod freely movable in said cavity.

8. A fluid-operated brake system as claimed in claim 1, wherein said master cylinder and said cylinder bores are coaxial.

9. A fluid-operated brake system as claimed in claim 8, wherein said joint means include a universal joint.

References Cited

UNITED STATES PATENTS 3,109,287 11/1963 Gardner.
3,159,975 12/1964 Ayers.
3,162,018 12/1964 Daley.

MARTIN P. SCHWADRON, Primary Examiner

ROBERT R. BUNEVICH, Assistant Examiner

U.S. Cl. X.R.

60—54.5; 188—152